United States Patent [19]

Bellamy et al.

[11] Patent Number: 4,613,251
[45] Date of Patent: Sep. 23, 1986

[54] BALL JOINT

[75] Inventors: John S. Bellamy, Gwynedd; Keith D. Elliott, Clwyd, both of Wales

[73] Assignee: Quinton Hazell, Wales

[21] Appl. No.: 713,846

[22] Filed: Mar. 20, 1985

[30] Foreign Application Priority Data

Mar. 21, 1984 [GB] United Kingdom ............... 8407317

[51] Int. Cl.$^4$ ............................................. F16C 11/06
[52] U.S. Cl. .................................... 403/135; 403/133; 403/114; 280/674
[58] Field of Search ............... 403/90, 112, 113, 114, 403/115, 135, 134, 133; 280/674

[56] References Cited

U.S. PATENT DOCUMENTS 2,886,341  5/1959  MacPherson .................... 280/674
3,090,642  5/1963  Gottschald et al. ............ 403/135 X
3,347,576  10/1967 Templeton ..................... 403/133 X
3,408,124  10/1968 Melton et al. .................. 403/133
4,162,859  7/1979  McAfee .......................... 280/674 X
4,332,500  6/1982  Smith, Jr. et al. .............. 403/114

FOREIGN PATENT DOCUMENTS 1323319  2/1963  France ............................ 403/133

Primary Examiner—Cornelius J. Husar
Assistant Examiner—Joseph A. Fischetti
Attorney, Agent, or Firm—Bernard, Rothwell & Brown

[57] ABSTRACT

A ball joint at the end of a track rod of a steering system has a ball pin rotatable in a socket at the end of the track rod. The spherical head of the ball pin has an extension on which a slug is slidable. The slug is constrained to move in a direction axially of the track rod in an aperture in the base plug which closes the socket.

8 Claims, 3 Drawing Figures

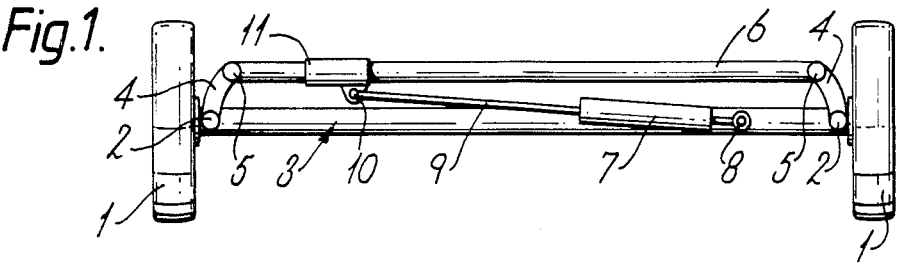
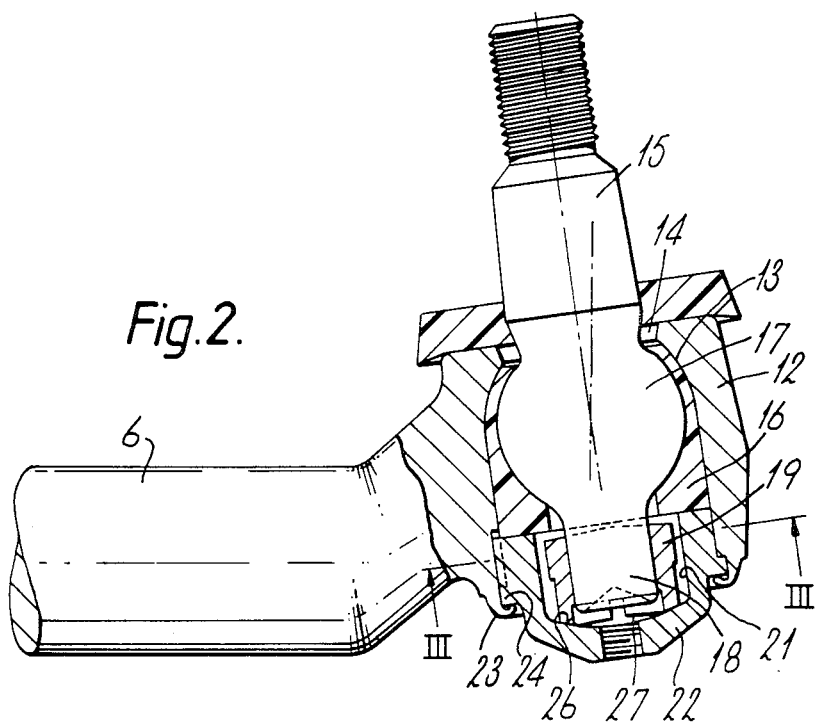
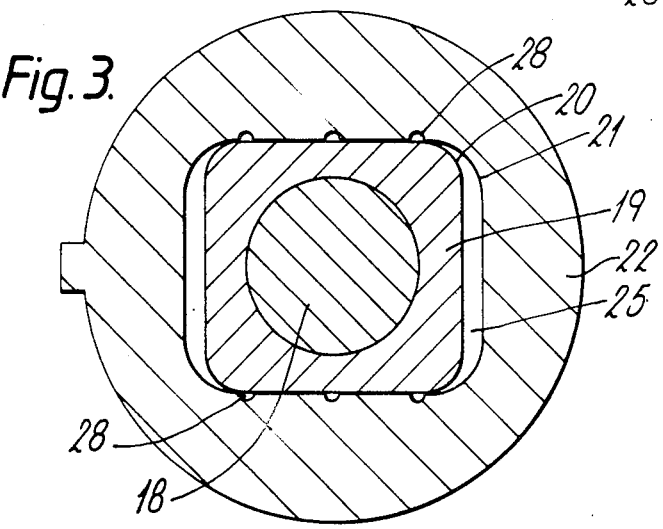

BALL JOINT

This invention relates to a ball joint for a steering system of a vehicle.

BACKGROUND OF THE INVENTION

Normally a steering system such as a power-assisted steering system has a track rod, drag link or the like, whose movement may be controlled hydraulically and which has a ball joint at each end. The ball joints are respectively connected to control or steering arms which are themselves connected to king pins mounted at the ends of the axial beam.

In an hydraulically-operated power assisted steering system using a track rod, for example, it is usual for an operating piston to be connected to the track rod. When the wheels are moved from full lock in one direction to full lock in the other direction the track rod becomes subjected to a twisting couple which tends to rotate the rod about its longitudinal axis, due to the inclination of the hydraulic cylinder in two planes relative to the track rod. This couple begins to act as soon as the wheels are moved from the straight-ahead position and the effect of this couple is to rotate the bodies of the ball joints at each end of the track rod around the spherical head of the ball pins about an axis along the length of the track rod, so that the necks of the ball pins strike against the edges of the sockets in the body of the track rod ends which receive the ball pins. Over extended periods under heavy duty service this may result in fatigue of the ball joints.

SUMMARY OF THE INVENTION

It is a main object of the present invention to provide an improved ball joint construction which accommodates any such twisting couple which might otherwise damage the ball joints.

According to the invention there is provided a ball joint at the end of a steering link such as a track rod or drag link of a steering system, in which the spherical head of a ball pin is rotatable in a socket at the end of the steering link, characterised in that the ball pin has an extension which extends from its spherical surface and engages in an aperture in the socket with restricted angular freedom of movement, thereby to prevent angular rotation of the joint about an axis along the length of the steering link.

In a preferred embodiment the base of the socket is closed by a plug having a central aperture in which the integral extension of the ball pin is housed, which aperture is shaped to constrain angular movement of said extension about a horizontal axis to movement about an axis perpendicular to that of the steering link.

Still further, according to the invention the aperture in the plug may be of rectangular cross section with its greater dimension in a direction axially of the steering link, a slug of square cross section is fitted on the extension, permitting rotation of the extension within the slug, and is a close fit within the lesser dimension of the rectangular aperture, thereby restraining movement of the extension to said angular movement within the greater dimension of the aperture.

Preferably the slug extends beyond the end of the extension of the pin, and has a spherical surface which bears on a complementary spherical surface within the plug to provide a bearing for said angular movement.

The invention also provides a ball joint for use at the end of a steering link, such as a track rod or drag link, of a steering system for a vehicle, comprising a socket housing a ball arranged for relative rotation within the socket about a first upwardly extending axis to permit adjustment of wheel direction in response to movement of the steering link, said ball being provided with an extension from its spherical surface along the direction of said first axis, and restraint means surrounding the said extension and arranged to restrict the extent of angular movement of the ball within the socket, said restraint means engaging the extension on two opposite sides so as to prevent angular movement of the ball within the socket about a second axis extending along the length of the steering link and thereby prevent movement of the ball due to torque in the steering link tending to twist part of the joint around the axis of the steering link, while permitting rotation of the joint about said first axis.

Preferably the restraint means provides spaces on two other opposite sides of the extension to provide limited angular movement of the joint about a third axis which is horizontal and perpendicular to said second axis.

Preferably said restraint means comprises a rectangular recess within the socket and a slidable mating plug within the recess arranged so that the slug may slide in a direction along the said second axis but is restrained against sliding movement in a direction along said third axis.

Preferably said slug is provided with a central aperture in which said extension is a close fit but free to rotate about said first axis.

Preferably said rectangular recess is provided in a plug member secured to the socket surrounding the ball.

Preferably said plug extends beyond the extension located within it, the slug having a spherical surface at an outer end which bears on a complementary spherical surface in said plug member to provide a bearing for rotation of the joint about said third axis.

Preferably the ball is provided with a further extension extending from the ball opposite the aforesaid extension, said further extension projecting from the socket for coupling to arm means connected to a wheel.

The invention also includes a steering system incorporating ball joints according to the invention.

BRIEF DESCRIPTION OF THE DRAWINGS

FIG. 1 is a schematic plan view of a conventional steering system in which the present invention may be used, FIG. 2 is an elevation, partly in section of a ball joint according to the invention at one end of a track rod, and FIG. 3 is a section on line III—III of FIG. 2.

DESCRIPTION OF THE PREFERRED EMBODIMENT

A conventional power-steering system is illustrated in FIG. 1. Two wheels 1 have stub axles rotatably mounted on king pins 2 which are carried on an axle beam 3. The stub axles are connected by control or steering arms 4 to ball joints 5 which in this example are at the ends of a track rod 6 although drag links or other like steering links may be used. An hydraulic operating cylinder 7 is pivotally mounted at 8 on the axle beam 3, and its piston rod 9 is pivotally connected at 10 to a collar 11 fixed on the track rod 6.

At one end, the track rod 6 has a conventional ball joint. At the other end a ball joint embodying the present invention is used. This has a socket 12, as shown in FIG. 2. The upper part of the socket is formed conventionally with a spherical surface 13 with an aperture 14 through which extends the mating part 15 of a ball pin for connection through a control arm 4 to a king pin 2 at one end of the axle beam.

A lubricating bearing liner 16 lines the upper end of the socket 12. This liner is for example of nylon, and provides a bearing surface for the spherical head 17 of the ball pin which is rotatable in the socket. The ball pin 17 has an integral extension 18 which is of cylindrical form and has a conical indentation at its end furthest from the head 17. A metal slug 19 of square outer cross section and having rounded corners 20, FIG. 3, is fitted on the extension 18, and has a central aperture of circular cross section which is dimensioned to be a free sliding fit on the extension 18 thereby permitting free rotation of the ball about a first axis extending upwardly through the length of the part 15. There is access for lubrication between the extension 18 and the inner surface of the slug.

The extension 18 and the slug 19 are housed in a central aperture 21 in a plug 22 which closes the base of the socket 12 and is firmly fixed in position by upturning the lower edge 23 of the socket against a flange 24 on the plug 22.

As shown in FIG. 3, the aperture 21 in the plug 22 is of rectangular cross section with rounded corners. The greater dimension of this rectangular cross section is in a direction axially of the track rod 6 and the lesser dimension has only a slightly greater dimension than the dimension of the sides of the square slug 19 so that there is a minimal clearance, e.g. 0.127mm, between two opposite side walls of the slug 19 and the longer walls of the aperture 21. This leaves spaces 25 between the other sides of the slug and the shorter end walls of the aperture 21.

The slug 19 extends beyond the end of the extension 18 of the ball pin and has a spherical surface 26 which bears on a complimentary spherical surface 27 formed on the inner surface of the base of the plug 22. Because the slug 19 is a sliding fit on the extension 18, in assembly of the joint in the normal upright position as shown in FIG. 2, the slug 19 falls under gravity into contact with the spherical surface 27 in the base of the plug 22. There are lubrication grooves 28 in the longer walls of the aperture 21.

In the embodiment illustrated the axis of the ball pin is inclined at 8° to an upright axis at right angles to the longitudinal axis of the track rod 6. This ensures that the ball pin remains parallel to the king pin axis on the axle beam.

In operation the ball pin is free to rotate through 360° by rotation of its spherical head 17 within its lubricating bearing 16 and rotation of the extension 18 within the slug 19.

The close fit of the sides of the slug 19 to the longer side walls of the aperture 21 ensure that the joint is prevented from angular movement about a second axis extending along the length of the track rod 6 and thereby resists twisting due to any torsion in the track rod tending to twist the joint about the axis of the track rod. The clearance 25 between the slug 19 and the ends of the aperture 21 permit a total angular movement of, for example 8°, of the ball pin axially relative to the track rod thereby permitting some joint movement about a third axis which is horizontal and perpendicular to said second axis along the length of the track rod.

By this arrangement movement of the joint to accommodate operation of the vehicle suspension is permitted and forces exerted by the track rod on the joint can be accommodated while reducing the tendency for the mating part 15 of the ball pins to strike the edge of the apertures 14 in the track rod sockets 12.

Ball joints according to the invention may be employed in steering systems other than those employing an hydraulic cylinder to move the track rod.

We claim:

1. A ball joint at the end of a steering link such as a track rod or drag link of a steering system, in which the spherical head of a ball pin is rotatable in a socket at the end of the steering link, the ball pin having an extension which extends from its spherical surface and engages in a plug having a central aperture said aperture being of rectangular cross section with its greater dimension in a direction axially of the steering link, and a slug of rectangular cross section being fitted on the extension permitting rotation of the extension within the slug, said slug being a close fit within the lesser dimension of the rectangular aperture, but slidable within the greater dimension of the rectangular aperture thereby preventing angular rotation of the joint about an axis along the length of the steering link and constraining angular movement of said extension about a horizontal axis to movement about an axis perpendicular to that of the steering link.

2. A ball joint according to claim 1, wherein the slug extends beyond the end of the extension of the pin, and has a spherical surface which bears on a complementary spherical surface within the plug to provide a bearing for said angular movement.

3. A ball joint for use at the end of a steering link, such as a track rod or drag link, of a steering system for a vehicle, comprising a socket housing a ball arranged for relative rotation within the socket about a first upwardly extending axis to permit adjustment of wheel direction in response to movement of the steering link, said ball being provided with an extension from its spherical surface along the direction of said first axis, and restraint means surrounding the said extension and arranged to restrict the extent of angular movement of the ball within the socket, said restraint means comprising a rectangular recess within the socket and a slidable mating slug within the recess, the recess engaging the slug on two opposite sides but being spaced therefrom on two other opposite sides so that the slug may slide in a direction along a second axis extending along the length of the steering link but is restrained against sliding movement in a direction along a third axis horizontal and perpendicular to said second axis, said extension engaging the slug so as to prevent angular movement of the ball within the socket about said second axis, thereby preventing movement of the ball due to torque in the steering link tending to twist part of the joint around the axis of the steering link, while permitting rotation of the joint about said first axis, and limited angular movement about said third axis.

4. A ball joint according to claim 3 in which said slug is provided with a central aperture in which said extension is a close fit but free to rotate about said first axis.

5. A ball joint according to claim 3 in which said rectangular recess is provided in a plug member secured to the socket surrounding the ball.

6. A ball joint according to claim 5 wherein said slug extends beyond the extension located within it, the slug having a spherical surface at an outer end which bears on a complementary spherical surface in said plug member to provide a bearing for rotation of the joint about said third axis.

7. A ball joint according to claim 3 in which the ball is provided with a further extension from the ball opposite the aforesaid extension, said further extension projecting from the socket for coupling to arm means connected to a wheel.

8. A steering system incorporating a ball joint according to claim 3.

* * * * *